Figure 1:
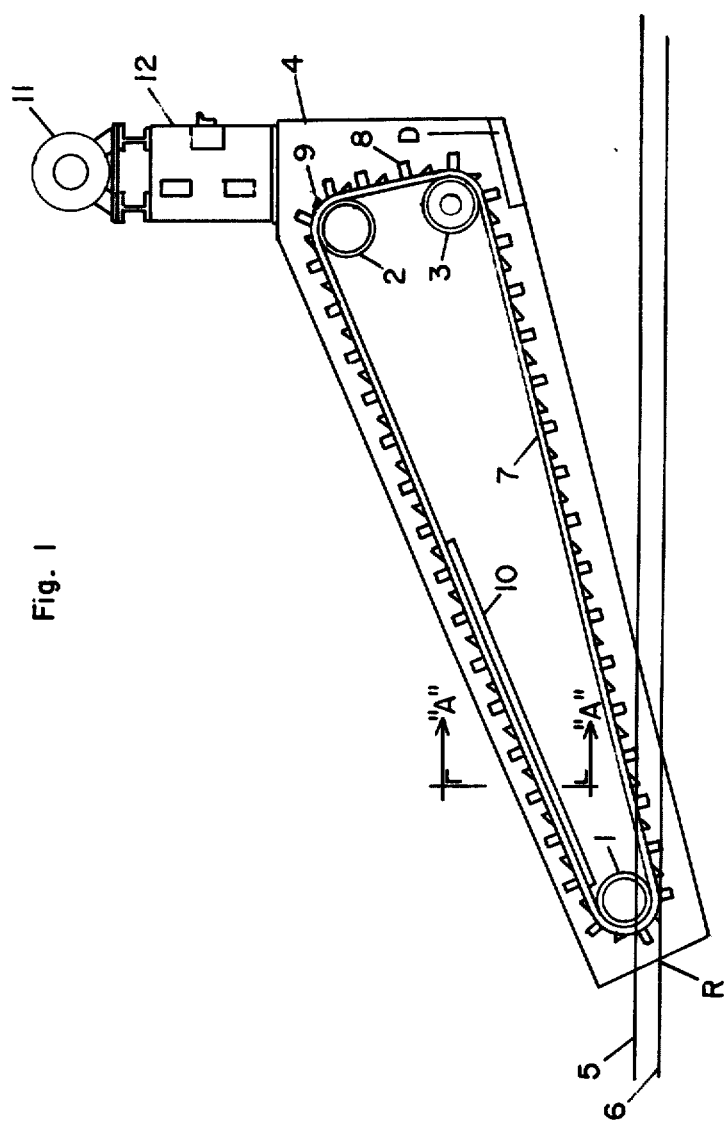

United States Patent [19]
Erskine

[11] 3,933,651
[45] Jan. 20, 1976

[54] RECOVERING BITUMEN FROM LARGE WATER SURFACES

[75] Inventor: Harold L. Erskine, Devon, Pa.

[73] Assignee: Great Canadian Oil Sands Limited, Toronto, Canada

[22] Filed: Oct. 7, 1974

[21] Appl. No.: 512,371

[52] U.S. Cl. .............................. 210/400; 210/526
[51] Int. Cl.² .................................... B01D 35/08
[58] Field of Search ...... 210/83, 242, 400, DIG. 21, 210/526; 37/69, 60

[56] References Cited
UNITED STATES PATENTS

| | | |
|---|---|---|
| 352,311 | 11/1886 | Gilchrist .............................. 37/69 |
| 355,488 | 1/1887 | Urie ................................... 37/69 |
| 748,804 | 1/1904 | Smyth et al. ........................ 37/60 |
| 1,739,326 | 12/1929 | Posselt ............................... 37/69 |
| 3,613,891 | 10/1971 | Cloutier ............................ 210/526 |
| 3,677,407 | 7/1972 | McIllvaine ........................ 210/526 |
| 3,734,294 | 5/1973 | Zerbe ........................... 210/DIG. 21 |
| 3,762,558 | 10/1973 | Anderson ......................... 210/526 |

Primary Examiner—Theodore A. Granger
Attorney, Agent, or Firm—J. Edward Hess; Donald R. Johnson; Richard P. Maloney

[57] ABSTRACT

The specification discloses an apparatus for recovering bitumen from large water surfaces. The apparatus comprises a crowned continuous conveyor belt with screen-bottomed scoops spaced along the outer surface of the belt.

1 Claim, 3 Drawing Figures

SECTION "A-A"

SECTION "A-A"

RECOVERING BITUMEN FROM LARGE WATER SURFACES

BACKGROUND OF THE DISCLOSURE

The present invention relates to an apparatus for recovering floating bitumen from large bodies of water. Most devices for recovering oil or bitumen from bodies of water are concerned with the recovery of thin film. For example, U.S. Pat. No. 3,314,545, to Grabbe et al., issued Apr. 18, 1967, proposes an endless conveyor belt of nonabsorbent material to which oil adheres. The Grabbe et al. apparatus and method are uniquely suited to solving the problem of recovering a thin layer or film of oil. Currently, apparatus designed for the recovery of large volumes of thick tarry or bituminous floating materials either recover undesirably large quantities of water with the bitumen or do not recover maximum quantities of bitumen.

The present apparatus permits recovery of floating bitumen from large bodies of water in a manner whereby the amount of water recovered with the bitumen is substantially less than that recovered using other equipment.

DESCRIPTION OF THE INVENTION

The present invention is directed to the recovery of larger quantities of oil or bitumen from the surface of large bodies of water. The present invention also makes possible maximum recovery of floating bitumen or tarry oil substantially free from water. The apparatus of the present invention comprises a continuous conveyor belt which is crowned so that its upper outer surface slopes downwardly from a longitudinal apex, means for continuously rotating the belt from a recovery area to discharge area, and screen bottomed scoops spaced along the outer surface of the belt. The belt can be mounted so that it can be raised or lowered or swept back and forth. The screen bottomed scoops can be buckets with removable or permanent screen bottoms. In operation the belt is set so that the scoops dip into the water at the recovery area immediately below the bitumen water interface. The belt is then set into operation. The scoops dip into the body of water and carry water and bitumen up and away from the recovery area to a discharge area. As the belt passes between the areas, water drains through the scoop screening to the belt surface. The belt crown directs the water to the belt edge where it can be collected by troughs or merely discharged off. The belt can be provided with baffles to aid in deflecting the water sideward of the belt.

The screen is of a mesh size to allow the passage of water therethrough, but to retain the bitumen. This mesh size is between 3.0 mm and 30.0 mm and preferable between 6.0 mm and 20.0 mm. Screen of this mesh size allows the drainage of water, but retains the bitumen because of its higher surface tension.

The apparatus of this invention can be set at the edge of a body of water with its recovery area dipping down into the body surface and its discharge area directed to a receiving vessel on land. Alternatively, the apparatus can be mounted on a marine vessel of suitable displacement for moving recovery.

The process of the present invention can be described as a method for recovering floating bitumen from large bodies of water which comprises scooping the bitumen along with water from the body of water at a recovery zone, continuously passing the bitumen from the recovery zone to a discharge zone, draining the water from the bitumen while passing the bitumen from the recovery zone to the discharge zone and diverting the drained water from the passing bitumen to a disposal area.

The present invention is most useful for recovering floating bitumen from pondwater from a hot water process for treating tar sands. In the hot water method, bituminous tar sands are jetted with steam and mulled with a minor amount of hot water at temperatures in the range of 140° to 210°F. The resulting pulp is screened, diluted and carried to a separations cell maintained at a temperature of about 150° to 200°F. In the separation cell, sand settles to the bottom as tailings and bitumen rises to the top in the form of an oil froth. An aqueous middlings layer containing some mineral and bitumen is formed between these layers. A scavenger step may be conducted on the middlings layer from the primary separation step to recover additional amounts of bitumen therefrom. This step usually comprises aerating the middlings as taught by K. A. Clark, "The Hot Water Washing Method", Canadian Oil and Gas Industries 3, 46 (1950). The froth from the primary separation and the froth from the scavenger step can be combined, diluted with naphtha and centrifuged to remove more water and residual mineral. The diluent is then distilled off and the bitumen is coked to a high quality crude suitable for further processing. The hot water process is described in detail by Floyd et al., Canadian Pat. No. 841,581 issued May 12, 1970.

A water effluent is removed from the hot water processing area and is discharged into a settling pond. This water effluent comprises middlings material of depleted bitumen content which has undergone final treatment, sand tailings layer and other discharged water-containing fractions which are not the primary products of the hot water process. The effluent is removed from the process area as a slurry of about 35 to 55, typically 45, percent solids by weight. This effluent contains virtually all of the clay material which was present in the feed and which typically amounts to 2 to 10 percent of the feed. This effluent is discharged to the upper portion of a sand pile zone which is inclined downwardly to a pond zone. The effluent percolates down through the sand pile and collects in the pond. After standing, a layer of thick bitumen separates from water in the pond and collects as a thick scum at the pond surface. Most of the processes and devices used for recovering oil from large bodies of water cannot be used to recover this bitumen from the pondwater because these devices and processes are designed for recovering thin films. On the other hand, it has been observed that processes for recovering larger volumes of liquid from the surface of another liquid are not suitable for recovering bitumen from pondwater because such processes and devices are not responsive to the varying interface between the bitumen and water. Such processes and devices either recover such large amounts of water along with the bitumen that the water cannot be easily removed or do not recover substantially all of the bitumen. The present invention makes possible the recovery of bitumen from pondwater and the subsequent collection of bitumen substantially free from water. Thus, the present invention makes possible the increased production of bitumen from bituminous tar sands in a hot water process.

FIG. 1 of the drawings is a schematic cut-away side view of an apparatus which is the preferred embodiment of the present invention.

Figure 3:
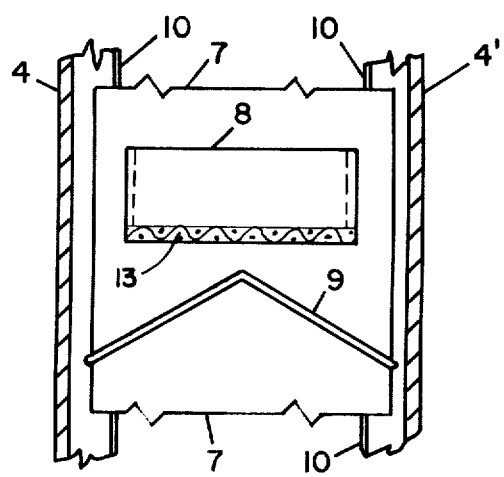

FIG. 3 of the drawings is an enlarged schematic view along the line A—A' of FIG. 1.

Figure 2:
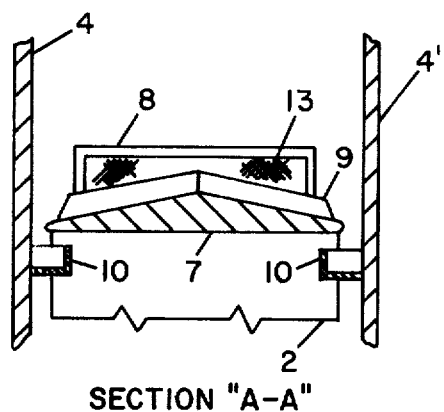

FIG. 3 of the drawings is a top view of the belt as shown in FIG. 2. FIGS. 2 and 3 show in detail the crowned belt and screened scoops which are characteristics of the apparatus of the present invention.

The apparatus of the present invention will be described in detail in reference to the drawings. In FIG. 1 rollers 1, 2 and 3 are mounted between side uprights 4 and 4' which when the apparatus is in use, extend at recovery zone R through bitumen layer 5 and into pondwater 6 below the bitumen-pondwater interface. Endless conveyor belt 7 runs over rollers 1, 2 and 3. This belt can be made of any suitable material of strength sufficient to support the filled load-carrying scoops.

The belt is crowned as shown in FIG. 2. The belt supports a plurality of scoops 8 and baffles 9 spaced along its outer surface. In this example the scoops 8 are screen-bottomed buckets. A trough 10 runs along each edge of belt 7 and is attached to side wall 4 at each side of an upper portion of the belt.

The belt is driven by a motor 11 via one or more of the rollers 1, 2 and 3. The drawing shows the belt 7 driven by motor 11 via roller 3. The speed of the belt can be adjusted according to the particular operation conditions by variable speed unit 12.

FIG. 2 is an enlarged section view of the belt 7 and scoops 8 and baffles along the line A—A' of FIG. 1. For the purpose of the description, the cut-away portion shown from line A—A' has been expanded to show the entire belt from the direction of lines A—A'. This is done to illustrate in detail the crown belt and screen scoops of the present invention.

FIG. 2 shows the upright side walls 4 and 4' of the apparatus with troughs 10 and shows the crowned conveyor belt 7 which supports load-carrying bucket 8 and baffle 9. The buckets have screen bottoms 13. FIG. 2 also shows roller 2 which can be crowned or any shape suitable to support the belt. All rollers 1, 2 and 3 can also be crowned to fit the contour of belt 7 if desired.

FIG. 3 of the drawings is a top view of the belt 7 as shown in FIG. 2. FIG. 3 shows the apparatus side walls 4 and 4', the belt 7 as viewed from the top, bucket scoop 8, baffle 9 and troughs 10.

In operation the lower end of the apparatus is placed into the floating bitumen at recovery zone R. The apparatus is placed so that the buckets 8 of the belt 7 dip just below the bitumen pondwater interface. This can be done by activating the belt and slowly dipping the belt and buckets into the floating bitumen until some water is recovered with bitumen. This described operation is the preferred operation because it insures maximum recovery of bitumen. The buckets on the belt dip into the floating bitumen and carry bitumen and water clockwise on the upper belt area to discharge area D where the product is delivered to suitable collectors. As the buckets travel from the recovery area R to discharge area D, water settles down from the bitumen and passes through the screen 13. The screen is of a mesh size such that the water will pass freely through but that the bitumen because of its greater viscosity and stickiness will be retained. The water passes through the screen 13 to the belt surface 7 where because of the belt crown design and because of baffles 9 it is diverted to the belt side, off the belt and into troughs 10. The water is collected in troughs 10 and is then delivered back into the pond.

This apparatus and operation as described above gives a maximum recovery of heavy floating bitumen substantially free from water. In a hot water process operation, this bitumen can be added to the combined froth products, diluted and centrifuged. This apparatus and operation can therefore be used to increase the yields of bitumen from the hot water process.

The invention claimed is:

1. An endless belt apparatus for recovering thick, tarry, bituminous froth from the surface of a body of water and delivering said froth to a discharge area above said body of water, said apparatus comprising in combination a frame supporting at least two rollers constructed and arranged to support an endless belt in an inclined position from the surface of said body of water to discharge area above said body of water, said belt comprising a downwardly sloping outer surface extending from a longitudinal raised central portion of the belt to its periphery, a plurality of screen-bottom buckets supported by said belt on the outer surface thereof along its peripheral length, said screen bottoms having a mesh size in the range of 3.0 to 30.0 millimeters to selectively retain said bituminous froth in said bucket, passing fluids through said screen bottoms while moving from said body of water to said discharge area, baffle means located on the outer surface of said belt adjacent to each of said buckets, whereby fluid passing through said buckets is deflected toward said downwardly sloping surface of each side of said belt, and a means for rotating said belt.

* * * * *